(12) United States Patent
Kerr et al.

(10) Patent No.: US 9,408,032 B1
(45) Date of Patent: Aug. 2, 2016

(54) CONTENT DELIVERY SYSTEM, DEVICE AND METHOD

(75) Inventors: Michael A. Kerr, Reno, NV (US); David Stewart, Stateline, NV (US)

(73) Assignee: NEXRF CORPORATION, Reno, NV (US)

( * ) Notice: Subject to any disclaimer, the term of this patent is extended or adjusted under 35 U.S.C. 154(b) by 353 days.

(21) Appl. No.: 13/153,238

(22) Filed: Jun. 3, 2011

Related U.S. Application Data

(63) Continuation-in-part of application No. 12/821,852, filed on Jun. 23, 2010, now Pat. No. 8,738,024, which is a continuation-in-part of application No. 12/413,547, filed on Mar. 28, 2009, now Pat. No. 8,942,995.

(60) Provisional application No. 61/351,677, filed on Jun. 4, 2010, provisional application No. 61/351,770, filed on Jun. 4, 2010, provisional application No. 61/352,242, filed on Jun. 7, 2010, provisional application No. 61/223,565, filed on Jul. 7, 2009, provisional application No. 61/040,661, filed on Mar. 29, 2008.

(51) Int. Cl.
*H04W 4/02* (2009.01)

(52) U.S. Cl.
CPC ..................................... *H04W 4/023* (2013.01)

(58) Field of Classification Search
USPC ......................................... 463/20, 30, 40, 42
See application file for complete search history.

(56) References Cited

U.S. PATENT DOCUMENTS

| 4,339,798 A | 7/1982 | Hedges et al. |
| 4,856,787 A | 8/1989 | Itkis |
| 5,586,937 A | 12/1996 | Menashe |

(Continued)

FOREIGN PATENT DOCUMENTS

| FI | WO2008065257 A1 | 6/2008 |
| WO | 2008065257 A1 | 6/2008 |

OTHER PUBLICATIONS

"Internet Industry Interacting Gambling Code: A Code for Industry Co-Regulation in the Area of Internet Gambling Content Pursuant to the Requirements of the Interactive Gaming Act of 2001". Internet Industry Association. Dec. 2001.

(Continued)

*Primary Examiner* — Paul A D'Agostino
*Assistant Examiner* — Brandon Gray
(74) *Attorney, Agent, or Firm* — Kerr IP Group, LLC; Michael A. Kerr

(57) ABSTRACT

A content delivery system, device and method is described. The content delivery system includes a database and a content presentation module. The database includes a user profile, user attributes, content items, and indoor geofences. The content presentation module presents a first list of targeted content items associated with a first user profile on a first wireless device. The first list of targeted content items corresponds to a first user attribute and a particular indoor geofence. The content presentation module also presents a second list of targeted content items associated with a second user profile on a second wireless device. The first list of targeted content items presented on the first wireless device is different from the second list of targeted content items presented on the second wireless device at the particular indoor geofence, when the first user attribute is different from the second user attribute.

16 Claims, 11 Drawing Sheets

(56) References Cited

U.S. PATENT DOCUMENTS

| | | |
|---|---|---|
| 5,594,491 A | 1/1997 | Hodge et al. |
| 5,630,757 A | 5/1997 | Gagin et al. |
| 5,643,086 A | 7/1997 | Alcorn et al. |
| 5,738,583 A | 4/1998 | Comas et al. |
| 5,761,416 A | 6/1998 | Mandal et al. |
| 5,761,647 A | 6/1998 | Boushy |
| 5,762,552 A | 6/1998 | Vuong et al. |
| 5,768,382 A | 6/1998 | Schneier et al. |
| 5,779,545 A | 7/1998 | Berg et al. |
| 5,800,268 A | 9/1998 | Molnick |
| 5,851,149 A | 12/1998 | Xidos et al. |
| 5,871,398 A | 2/1999 | Schneier et al. |
| 5,902,983 A | 5/1999 | Crevalt et al. |
| 5,947,821 A | 9/1999 | Stone |
| 5,971,849 A | 10/1999 | Falciglia |
| 6,001,016 A | 12/1999 | Walker et al. |
| 6,010,404 A | 1/2000 | Walker et al. |
| 6,106,396 A | 8/2000 | Alcorn et al. |
| 6,142,876 A | 11/2000 | Cumbers |
| 6,159,095 A | 12/2000 | Frohm et al. |
| 6,178,510 B1 | 1/2001 | O'Connor et al. |
| 6,203,428 B1 | 3/2001 | Giobbi et al. |
| 6,259,405 B1 | 7/2001 | Stewart et al. |
| 6,322,446 B1 | 11/2001 | Yacenda |
| 6,327,535 B1 | 12/2001 | Evans et al. |
| 6,409,602 B1 | 6/2002 | Wiltshire et al. |
| 6,500,068 B2 | 12/2002 | Walker et al. |
| 6,508,709 B1 | 1/2003 | Karmarkar |
| 6,508,710 B1 | 1/2003 | Paravia et al. |
| 6,527,638 B1 | 3/2003 | Walker et al. |
| 6,554,705 B1 | 4/2003 | Cumbers |
| 6,575,834 B1 | 6/2003 | Lindo |
| 6,606,494 B1 | 8/2003 | Arpee et al. |
| 6,612,928 B1 | 9/2003 | Bradford et al. |
| 6,628,939 B2 | 9/2003 | Paulsen |
| 6,638,170 B1 | 10/2003 | Crumby |
| 6,640,218 B1 | 10/2003 | Golding et al. |
| 6,676,522 B2 * | 1/2004 | Rowe et al. ............... 463/42 |
| 6,682,421 B1 | 1/2004 | Rowe et al. |
| 6,702,672 B1 | 3/2004 | Angell et al. |
| 6,709,333 B1 | 3/2004 | Bradford et al. |
| 6,709,631 B2 | 3/2004 | Mori et al. |
| 6,719,631 B1 | 4/2004 | Tulley et al. |
| 6,749,512 B2 | 6/2004 | MacGregor et al. |
| 6,782,253 B1 | 8/2004 | Shteyn et al. |
| 6,834,195 B2 | 12/2004 | Brandenberg et al. |
| 6,875,110 B1 | 4/2005 | Crumby |
| 6,879,838 B2 | 4/2005 | Rankin et al. |
| 6,884,162 B2 | 4/2005 | Raverdy et al. |
| 6,942,574 B1 | 9/2005 | LeMay et al. |
| 7,035,651 B2 | 4/2006 | Schreiner et al. |
| 7,076,243 B2 | 7/2006 | Parupudi et al. |
| 7,107,245 B1 | 9/2006 | Kowalick |
| 7,136,915 B2 | 11/2006 | Rieger, III |
| 7,196,662 B2 | 3/2007 | Misikangas et al. |
| 7,209,752 B2 | 4/2007 | Myllymaki et al. |
| 7,213,048 B1 | 5/2007 | Parupudi et al. |
| 7,218,941 B1 | 5/2007 | Kubo et al. |
| 7,228,136 B2 | 6/2007 | Myllymaki et al. |
| 7,299,059 B2 | 11/2007 | Misikangas et al. |
| 7,338,372 B2 | 3/2008 | Morrow et al. |
| 7,341,522 B2 | 3/2008 | Yamagishi |
| 7,349,683 B2 | 3/2008 | Misikangas |
| 7,359,714 B2 | 4/2008 | Parupudi et al. |
| 7,397,424 B2 | 7/2008 | Houri |
| 7,450,954 B2 | 11/2008 | Randall |
| 7,493,565 B2 | 2/2009 | Parupudi et al. |
| 7,529,639 B2 | 5/2009 | Rasanen et al. |
| 7,534,169 B2 | 5/2009 | Amaitis et al. |
| 7,611,407 B1 | 11/2009 | Itkis et al. |
| 7,753,772 B1 | 7/2010 | Walker et al. |
| 8,002,617 B1 | 8/2011 | Uskela et al. |
| 8,029,349 B2 | 10/2011 | Lind |
| 8,172,684 B2 | 5/2012 | Adiraju et al. |
| 8,403,755 B2 | 3/2013 | Kerr |
| 8,506,406 B2 | 8/2013 | Kerr |
| 8,506,407 B2 | 8/2013 | Kerr |
| 8,523,679 B2 | 9/2013 | Kerr |
| 8,738,024 B1 | 5/2014 | Kerr |
| 8,747,229 B2 | 6/2014 | Kerr |
| 8,942,995 B1 | 1/2015 | Kerr |
| 2001/0004768 A1 | 6/2001 | Hodge et al. |
| 2001/0005908 A1 | 6/2001 | Hodge et al. |
| 2001/0036224 A1 | 11/2001 | Demello et al. |
| 2001/0039210 A1 | 11/2001 | St-Denis |
| 2001/0044337 A1 | 11/2001 | Rowe et al. |
| 2002/0002073 A1 | 1/2002 | Montgomery et al. |
| 2002/0007494 A1 | 1/2002 | Hodge |
| 2002/0056125 A1 | 5/2002 | Hodge et al. |
| 2002/0056143 A1 | 5/2002 | Hodge et al. |
| 2002/0069105 A1 | 6/2002 | Botelho et al. |
| 2002/0077130 A1 | 6/2002 | Owensby |
| 2002/0077167 A1 | 6/2002 | Merari |
| 2002/0091568 A1 | 7/2002 | Kraft et al. |
| 2002/0103028 A1 | 8/2002 | Carter et al. |
| 2002/0111210 A1 | 8/2002 | Luciano et al. |
| 2002/0111907 A1 | 8/2002 | Ling |
| 2002/0133707 A1 | 9/2002 | Newcombe |
| 2002/0142815 A1 | 10/2002 | Candelore |
| 2002/0142844 A1 | 10/2002 | Kerr |
| 2002/0142846 A1 | 10/2002 | Paulsen |
| 2002/0144151 A1 | 10/2002 | Shell et al. |
| 2002/0174436 A1 | 11/2002 | Wu et al. |
| 2002/0198775 A1 * | 12/2002 | Ryan ............................... 705/14 |
| 2003/0009385 A1 | 1/2003 | Tucciarone et al. |
| 2003/0030666 A1 | 2/2003 | Najmi et al. |
| 2003/0032409 A1 | 2/2003 | Hutcheson et al. |
| 2003/0064805 A1 | 4/2003 | Wells |
| 2003/0119578 A1 | 6/2003 | Newson |
| 2003/0144017 A1 | 7/2003 | Inselberg |
| 2004/0023721 A1 | 2/2004 | Giobbi |
| 2004/0192438 A1 | 9/2004 | Wells et al. |
| 2004/0224757 A1 | 11/2004 | Yamamura et al. |
| 2005/0046608 A1 | 3/2005 | Schantz et al. |
| 2005/0048990 A1 | 3/2005 | Lauriol |
| 2005/0085257 A1 | 4/2005 | Laird et al. |
| 2005/0114212 A1 | 5/2005 | Carrez et al. |
| 2005/0136949 A1 | 6/2005 | Barnes |
| 2005/0154646 A1 | 7/2005 | Chermesino |
| 2005/0159883 A1 | 7/2005 | Humphries et al. |
| 2005/0181804 A1 | 8/2005 | Misikangas et al. |
| 2005/0246334 A1 | 11/2005 | Tao et al. |
| 2005/0261063 A1 * | 11/2005 | Boyd et al. ............... 463/42 |
| 2006/0003830 A1 | 1/2006 | Walker et al. |
| 2006/0004627 A1 | 1/2006 | Baluja |
| 2006/0058102 A1 | 3/2006 | Nguyen et al. |
| 2006/0063575 A1 | 3/2006 | Gatto et al. |
| 2006/0125693 A1 | 6/2006 | Recker |
| 2006/0181411 A1 | 8/2006 | Fast et al. |
| 2006/0189382 A1 | 8/2006 | Muir et al. |
| 2006/0194633 A1 | 8/2006 | Paulsen |
| 2006/0238382 A1 | 10/2006 | Kimchi et al. |
| 2006/0240891 A1 | 10/2006 | Klinkhammer et al. |
| 2006/0287810 A1 | 12/2006 | Sadri et al. |
| 2007/0024580 A1 | 2/2007 | Sands et al. |
| 2007/0025265 A1 | 2/2007 | Porras et al. |
| 2007/0060306 A1 * | 3/2007 | Amaitis et al. ............ 463/25 |
| 2007/0061229 A1 | 3/2007 | Ramer et al. |
| 2007/0087834 A1 | 4/2007 | Moser et al. |
| 2007/0100963 A1 | 5/2007 | Ban et al. |
| 2007/0136132 A1 | 6/2007 | Weiser et al. |
| 2007/0149215 A1 | 6/2007 | Misikangas |
| 2007/0149216 A1 | 6/2007 | Misikangas |
| 2007/0167210 A1 | 7/2007 | Kelly et al. |
| 2007/0168127 A1 | 7/2007 | Zaruba et al. |
| 2007/0184852 A1 | 8/2007 | Johnson et al. |
| 2007/0218975 A1 | 9/2007 | Iddings et al. |
| 2007/0243925 A1 | 10/2007 | LeMay et al. |
| 2007/0244633 A1 | 10/2007 | Phillips et al. |
| 2007/0257831 A1 | 11/2007 | Mathews et al. |
| 2007/0270212 A1 | 11/2007 | Cockerille et al. |
| 2007/0281692 A1 | 12/2007 | Bucher et al. |
| 2008/0026844 A1 | 1/2008 | Wells |
| 2008/0032705 A1 | 2/2008 | Patel et al. |

(56) References Cited

U.S. PATENT DOCUMENTS

| | | |
|---|---|---|
| 2008/0039192 A1 | 2/2008 | Laut |
| 2008/0057894 A1 | 3/2008 | Aleksic et al. |
| 2008/0076572 A1 | 3/2008 | Nguyen et al. |
| 2008/0085692 A1 | 4/2008 | Hart et al. |
| 2008/0096659 A1 | 4/2008 | Kreloff et al. |
| 2008/0097858 A1 | 4/2008 | Vucina et al. |
| 2008/0102947 A1 | 5/2008 | Hays et al. |
| 2008/0108430 A1 | 5/2008 | Evans |
| 2008/0113785 A1 | 5/2008 | Alderucci et al. |
| 2008/0153515 A1 | 6/2008 | Mock et al. |
| 2008/0162037 A1 | 7/2008 | Hasan |
| 2008/0166973 A1 | 7/2008 | Hart et al. |
| 2008/0167106 A1 | 7/2008 | Lutnick et al. |
| 2008/0186234 A1 | 8/2008 | Alles et al. |
| 2008/0189360 A1 | 8/2008 | Kiley et al. |
| 2008/0207296 A1 | 8/2008 | Lutnick et al. |
| 2008/0227473 A1 | 9/2008 | Haney |
| 2008/0249833 A1 | 10/2008 | Ali et al. |
| 2008/0252527 A1 | 10/2008 | Garcia |
| 2008/0281668 A1 | 11/2008 | Nurminen |
| 2009/0197684 A1* | 8/2009 | Arezina et al. ............... 463/42 |
| 2009/0213771 A1 | 8/2009 | Celentano et al. |
| 2010/0022308 A1 | 1/2010 | Hartmann et al. |
| 2010/0027521 A1 | 2/2010 | Huber et al. |
| 2010/0039929 A1 | 2/2010 | Cho et al. |
| 2010/0048242 A1 | 2/2010 | Rhoads et al. |
| 2010/0063854 A1 | 3/2010 | Purvis et al. |
| 2010/0121567 A1 | 5/2010 | Mendelson |
| 2010/0167771 A1 | 7/2010 | Raghothaman et al. |
| 2010/0287033 A1 | 11/2010 | Mathur |
| 2010/0302056 A1 | 12/2010 | Dutton et al. |
| 2010/0305855 A1 | 12/2010 | Dutton et al. |
| 2010/0331016 A1 | 12/2010 | Dutton et al. |
| 2011/0078167 A1 | 3/2011 | Sundaresan et al. |
| 2011/0103360 A1 | 5/2011 | Ku et al. |
| 2012/0115512 A1 | 5/2012 | Grainger et al. |
| 2012/0122476 A1 | 5/2012 | Lee et al. |
| 2013/0003572 A1 | 1/2013 | Kim et al. |

OTHER PUBLICATIONS

Wirelss Network. Wikipedia. http://en.wikipedia.org/wiki/Wireless_network. Nov. 17, 2008.
"Tracking Cookie." Wikipedia. http://en.wikipedia.org/wiki/Tracking_cookie. May 24, 2009.
Blom et al. "Transmission Power Measurements for Wireless Sensor Nodes and their Relationship to Battery Level." Symposium on Wireless Communication Systems. pp. 342-345, Sep. 7, 2005.
"Wi-Fi Location-Based Services—Design and Deployment Considerations." 2006 Cisco Systems. Accessed Dec. 2008. https://learningnetwork.cisco.com/docs/DOC-3418.
"Location in SIP/IP Core Architecture." Open Mobile Alliance. Sep. 4, 2008. Accessed Dec. 2008. http://www.openmobilealliance.org/technical/release_program/locsip_archive.aspx.
Want et al. "The Active Badge Location System." ACM Transactions on Office Information Systems (TOIS) vol. 10. No. 1, pp. 91-102, Jan. 1992.
Youssef et al. "Location-Clustering Techniques for WLAN Location Determination Systems." 2006. http://wrc.ejust.edu.eg/papers/ijca.pdf.
Vegni et al. "Local Positioning Services on IEEE 802.11 Networks." Radio Engineering, pp. 42-47, vol. 17, No. 2, Jun. 2008.
Ladd et al. "On the Feasibility of Using Wireless Ethernet for Indoor Localization." IEEE Transactions on Robotics and Automation, pp. 555-559, vol. 20, Issue 3, No. 3, Jun. 2004.
Ladd et al. "Using Wireless Ethernet for Localization." IEEE/RJS International Conference on Intelligent Robots and Systems. 2002.
Kitasuka et al. "Positioning Technique of Wireless LAN Terminal Using RSSI between Terminals". Jun. 2005. Accessed Dec. 2008. http://www.techrepublic.com/whitepapers/positioning-technique-of-wireless-lan-terminals-using-rssi-between-terminals/330959.
Lafargue, Edouard. "Wireless Network Audits using Open Source Tools". SANS Institute 2003. Accessed Dec. 2008. http://www.sans.org/reading_room/whitepapers/auditing/wireless-network-audits-open-source-tools_1235.
Heidari, Mohannad. "A Testbed for Real-Time Performance Evaluation of RSS-Based Indoor Geolocation Systems in a Laboratory Environment". Apr. 21, 2005. Accessed Dec. 2008. https://www.wpi.edu/Pubs/ETD/Available/etd-050407-112549/unrestricted/massad.pdf.
Li et al. "A New Method for Yielding a Database of Location Fingerprints in WLAN" IEE Communications Proceedings, pp. 580-586, vol. 152, Issue 5, Oct. 7, 2005.
Sakata et al. "An efficient algorithm for Kriging approximation and optimization with large-scale sampling data". Computer Methods in Applied Mechanics and Engineering. vol. 193, Issues 3-5, pp. 385-404, Jan. 23, 2004.
Muthukrishnan, et al. "Sensing motion using spectral and spatial analysis of WLAN RSSI." Proceedings of the 2nd European conference on Smart sensing and context. 2007. pp. 62-76.
Capkun et al. "Mobility Helps Peer-to-Peer Security." IEEE Transactions on Mobile Computing. vol. 5, Issue 1, pp. 43-51, Jan. 2006.
Milojicic et al. "Peer-to-Peer Computing" Jul. 10, 2002. https://www.hpl.hp.com/techreports/2002/HPL-2002-57R1.pdf.
"The New Normal of Retailing: The Rise of the Mobile Shopper." Next Generation Retail Summit. 2010. http://www.ngrsummit.com/media/whitepapers/Microsoft_NGRUS.pdf.
Lamarca et al. "Place Lab: Positioning Using Radio Beacons in the Wild." Pervasive 2005, LNCS 3468, pp. 116-133, 2005.
Borriello et al. "Delivering Real-World Ubiquitous Location Systems." Communications of the ACM. pp. 36-41, vol. 48, Issue 3, Mar. 2005.
Schilit et al. "Challenge: Ubiquitous Location-Aware Computing and the "Place Lab" Initiative." WMASH Proceedings of the 1st ACM International Workshop on Wireless Mobile Applications and Services on WLAN Hotspots. 2003.
Hightower et al. "Practical Lessons from the Place Lab." IEEE Pervasive Computing. pp. 32-39, vol. 5, Issue 3, Jul.-Sep. 2006.
Hile et al. "Indoor Location Estimation with Placelab." http://www.cs.washington.edu/education/courses/cse590gb/04wi/projects/hile-liu/. Jan. 8, 2004. Accessed on Sep. 25, 2008.
Kang "Extracting Places from Traces of Locations." ACM SIGMOBILE Mobile Computing and Communications Review. vol. 9, Issue 3, Jul. 2005.
Lamarca et al. "Self-Mapping in 802.11 Location Systems." UbiComp 2005: Ubiquitous Computing Lecture Notes in Computer Science, 2005, vol. 3660/2005, 903, DOI: 10.1007111551201_6.
Otsason et al. "Accurate GSM Indoor Localization." Ubiquitous Computing 2005, LNCS 3660, pp. 141-158, 2005.
Chen et al. "Practical Metropolitan-Scale Positioning for GSM Phone." UbiComp 2006: Ubiquitous Computing Lecture Notes in Computer Science, 2006, vol. 4206/2006, pp. 225-242.
Varshavsky et al. "Are GSM Phones the Solution for Localization?" 7th IEEE Workshop on Mobile Computing Systems and Applications, 2006. pp. 34-42, Aug. 1, 2005.
Chawathe et al. "A Case Study in Building Layered DHT Applications." Proceedings of the 2005 conference on Applications, technologies, architectures, and protocols for computer communications. vol. 35, Issue 4, Oct. 2005.
Lamarca et al. "Finding Yourself: Experimental location technology relies on Wi-Fi and cellphone signals instead of orbiting satellites." Dec. 2004. http://spectrum.ieee.org/computing/networks/finding-yourself.
Letchner et al. "Large-Scale Localization from Wireless Signal Strength." In Proceedings of the National Conference on Artificial Intelligence (AAAI), 2005.
Welbourne et al. "Mobile Context Inference Using Low-Cost Sensors." Location and Context-Awareness Lecture Notes in Computer Science, 2005, vol. 3479/2005, pp. 95-127.
Balakrishnan et al. "Lessons from Developing and Deploying the Cricket Indoor Location System." Nov. 7, 2003. http://www.sds.lcs.mit.edu/projects/cricket/V1Exp.pdf.

(56) References Cited

OTHER PUBLICATIONS

Cheng et al. "Accuracy Characterization for Metropolitan-scale Wi-Fi Localization." Proceedings of the 3rd international conference on Mobile systems, applications, and services. 2005.
"Ekahau Positioning Engine 4.2." 2008. http://www.nowire.se/images/produktblad/ekahau/datasheet_epe_42_en_11022008_lo.pdf. Sep. 29, 2008.
USPTO, Notice of Allowance for U.S. Appl. No. 12/981,403 mailed on Jan. 31, 2014.
USPTO, Notice of Allowance for U.S. Appl. No. 12/413,547 mailed on Jun. 6, 2014.
"Wireless Network." Wikipedia. http://en.wikipedia.org/wiki/Wireless.sub.--network. Nov. 17, 2008.
HTTP Cookie, redirected from tracking cookie as downloaded from wikipedia, 41 pages.
Interactive Gambling Industry Code, Dec. 2001, 7 pages.
Wireless Network as downloaded from wikipedia.com, pages. 5 pages.

* cited by examiner

300

| User Attribute | |
|---|---|
| User ID | 12345678 |~302
| Attribute ID | 11111111 |~304
| Attribute Category | Game |~306
| Attribute Value | Blackjack |~308

| Attribute Groups | |
|---|---|
| User ID | 12345678 |~322
| Attribute Group ID | 11111111 |~324

Figure 3B

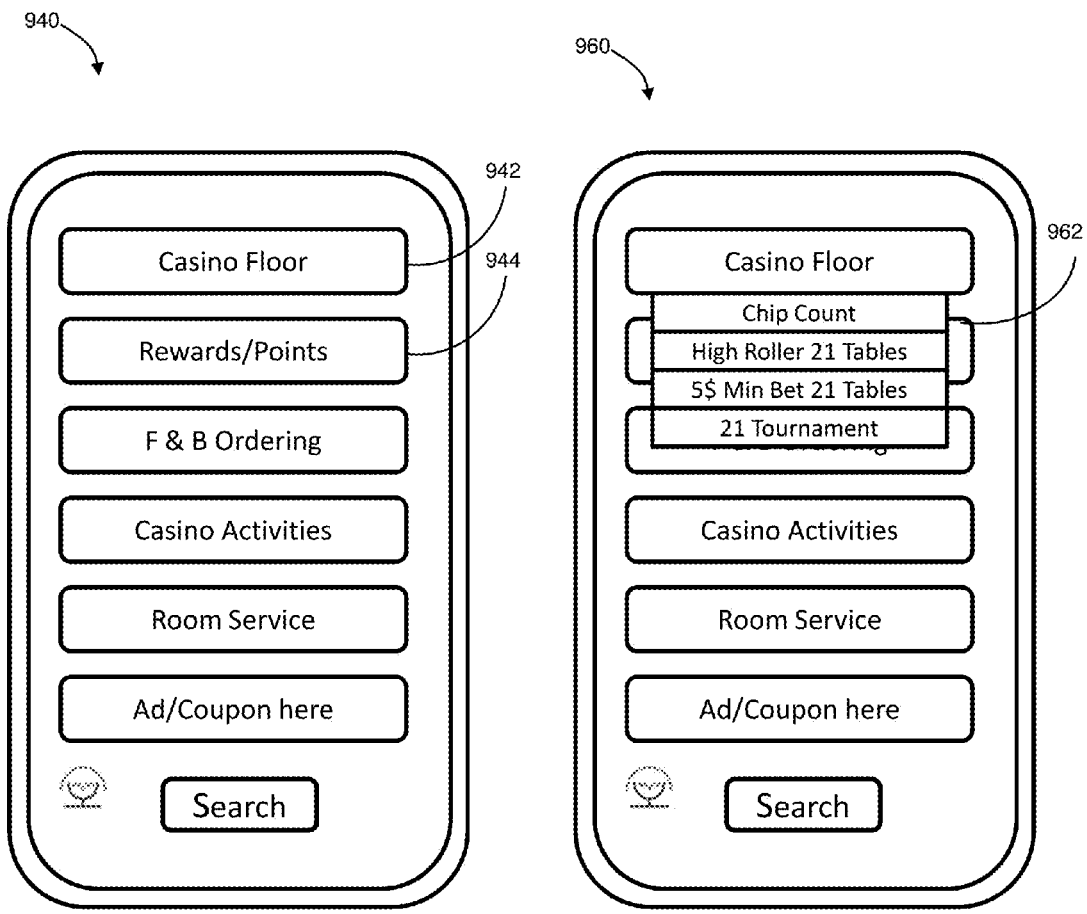

CONTENT DELIVERY SYSTEM, DEVICE AND METHOD

CROSS-REFERENCE

This patent application claims the benefit of provisional patent application 61/351,677 filed on Jun. 4, 2010;

this patent application also claims the benefit of provisional patent application 61/351,770 filed on Jun. 4, 2010;

this patent application also claims the benefit of provisional patent application 61/352,242 filed on Jun. 7, 2010;

this patent application is a continuation-in-part of patent application Ser. No. 12/821,852 filed on Jun. 23, 2010 that claims the benefit of provisional patent application 61/223,565 filed on Jul. 7, 2009;

this patent application is a continuation-in-part of patent application Ser. No. 12/413,547 filed on Mar. 28, 2009 that claims the benefit of provisional patent application 61/040,661 filed on Mar. 29, 2008;

this patent application is a continuation-in-part of patent application Ser. No. 11/948,007 filed on Nov. 30, 2007 that claims the benefit of provisional patent application 60/872,351 filed on Nov. 30, 2006; and all applications listed are hereby incorporated by reference.

FIELD

The present invention relates to a system and method for delivery of targeted content to a wireless handset. More particularly, the present invention relates to a system and method for filtering content by location and delivering the content to a wireless handset.

BACKGROUND

The wireless handset presents new opportunities for merchants to communicate with customers. The merchant may wish to provide information to the customer regarding a product or service, offer incentives to the customer to enter a premises or make a purchase, or provide services that utilize the capabilities of the wireless handset.

When a merchant premises is large or the merchant offers a complex variety of products, the customer may require assistance to find a desired product or to attain the information needed about a product to make a purchase decision. An employee with sufficient training, knowledge, and availability may be able to provide the needed assistance. If the employee is not available or able to assist, the customer may use a web browser on a wireless handset to find additional information about a desired product or service. However, the small display and interface format of a wireless handset may hinder the customer's effort to find information with a typical internet browser running on a wireless handset. Thus, there is a need for a custom interface specific to the merchant's offerings, allowing the merchant to provide information to the customer in an efficient and easily navigable fashion.

A merchant wishing to advertise to the customer may wish to leverage the functionality of the customer's wireless handset by providing targeted advertising to the user. Although a merchant may use a sign or an LCD display to provide advertising at a specific location on the merchant premises, these advertising mechanisms will typically be directed at the entire range of potential customer demographics, due to the inability of these mechanisms to distinguish among customers. There is a need for a platform that allows the merchant to provide advertising to a customer, taking into account the customer's location on or near the merchant premises and information about the customer that the customer has chosen to make available to the merchant.

Merchants having loyalty programs or other programs to increase interactions with the customer may rely on postal mail or e-mail to communicate with customers. However, the merchant lacks a means to incorporate the program into the customer experience on the merchant premises. Thus, there is a need for an application running on a wireless handset that allows a merchant to provide the benefits of the loyalty program to the customer while the customer is on or near the merchant premises.

While the customer may realize a number of benefits from the solutions described above, the customer will be discouraged if the merchant's use of the application fails to meet the customer's needs or exceeds the customer's desire for the information. There is a need for a feedback system which allows the customer to rank or decline the provided content to indicate which content is desired and/or helpful. Such a feedback system would ensure that the customer and other future customers would continue to receive the most desirable and useful information provided by the merchant.

Further, customers may only be willing to share the personal information that will allow the provided information to be targeted at the customer if the customer has control over what information is provided to the merchant. Thus, there is a need for an information privacy management system which the customer uses to control the information available to the merchant.

SUMMARY

A content delivery system, device and method is described. The content delivery system includes a database and a content presentation module. The database includes at least one user profile, in which each user profile comprises a plurality of user attributes. Additionally, the database includes a plurality of content items in which each content item is associated with at least one user attribute. Furthermore, the database includes at least one indoor geofence associated with each content item. The content presentation module presents a first list of targeted content items associated with a first user profile on a first wireless device. The first list of targeted content items corresponds to a first user attribute and a particular indoor geofence. The content presentation module also presents a second list of targeted content items associated with a second user profile on a second wireless device. The second list of targeted content items corresponds to a second user attribute and the particular indoor geofence. The first list of targeted content items presented on the first wireless device is different from the second list of targeted content items presented on the second wireless device at the particular indoor geofence, when the first user attribute is different from the second user attribute.

In one embodiment, the database includes a relevance value for each content item that ranks the content items based on user feedback to the list of targeted content items. Additionally, the relevance value for a content item that receives positive feedback improves the ranking of the content item in the list of targeted content items. Furthermore, the database includes a time range that is associated with a content item, which presents the content item within the corresponding time range.

The content delivery system may include a parent content item displayed on at least one list of targeted content items, in which the parent content item is associated with a child content item so that a selection of the parent content item presents the associated child content item. Additionally, the content delivery system may include a search term received on a wireless device that finds the relevant content items corresponding to the search term, which is then presented on the wireless device. Also, the list of targeted content items may include food and beverage ordering content items or loyalty program content items.

FIGURES

The present invention will be more fully understood by reference to the following drawings which are for illustrative, not limiting, purposes.

FIG. 3A shows an illustrative database table entry for a user attribute table.

FIG. 3B shows an illustrative database entry for an attribute group table.

FIGS. 9A-9D show an illustrative content interface on a wireless handset.

DETAILED DESCRIPTION

Persons of ordinary skill in the art will realize that the following description is illustrative and not in any way limiting. Other embodiments of the claimed subject matter will readily suggest themselves to such skilled persons having the benefit of this disclosure.

A merchant control plane for delivery of content to a user's wireless handset over a wireless network is described. The merchant control plane allows a merchant to associate content with customer information. Customer information may include information made available to the merchant by the customer through a user profile and information the merchant has collected about or generated for a customer based on, for example, the customer's transactional history for the merchant. The merchant may also associate the content with a location on or near the merchant premises. The merchant may further associate the content with a time range. The wireless handset communicates with a server to request content for the user. The server applies information stored in the user profile to make a determination of content to be targeted at the user. The server communicates with the wireless device to deliver the content.

Figure 1:
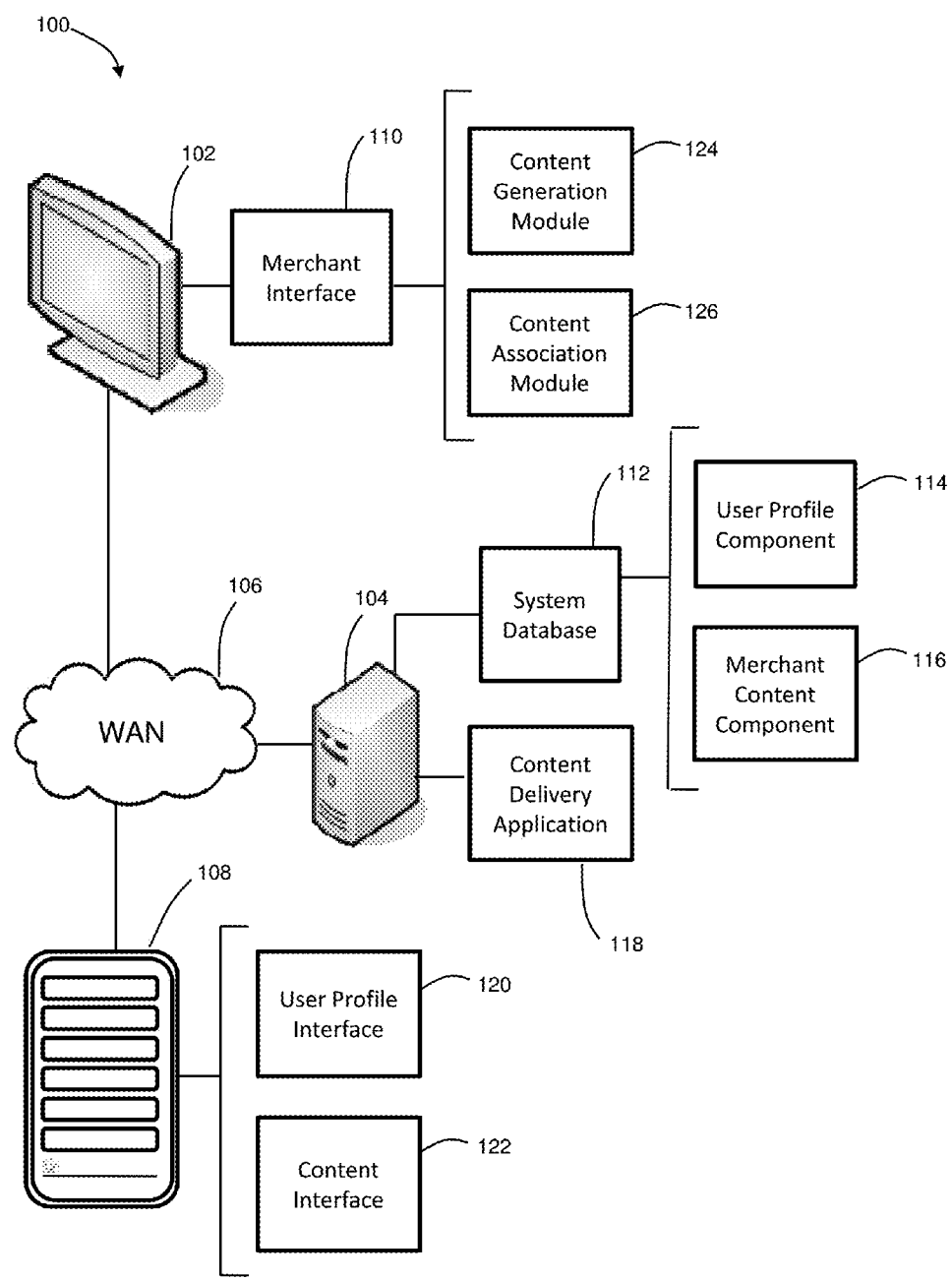
FIG. 1 shows an illustrative system architecture for a merchant content delivery system.

Referring to FIG. 1, an illustrative system architecture for a merchant content delivery system is shown. The system architecture comprises a merchant terminal 102, a server 104, a wireless network 106 and a wireless handset 108.

The merchant terminal 102 is a computing device capable of presenting a user interface to the content administrator for exchanging data with the server 104. The merchant terminal may be, for example, a personal computer. In some embodiments, the merchant terminal is a wireless handset.

The wireless handset 108 may be a mobile handset, mobile phone, wireless phone, portable cell phone, cellular phone, portable phone, a personal digital assistant (PDA), a tablet, a portable media device, or any type of mobile terminal which is regularly carried by a user and has all the elements necessary for operation in a wireless communication system. The wireless communications include, by way of example and not of limitation, CDMA, WCDMA, GSM or UMTS or any other wireless communication system such as wireless local area network, WLAN, Wi-Fi or WiMAX. It shall be appreciated by those of ordinary skill in the art that the term wireless handset, mobile handset, wireless phone, and mobile phone are interchangeable.

The wireless handset is in communication with an antenna. The antenna may be one of a plurality of base station antennas associated with a cellular phone network, or an antenna associated with wireless local area network access point, and may use Wi-Fi or WiMAX, or other such networking protocols.

The merchant terminal 102 and wireless handset 108 may be communicatively coupled to the server 104 via the wireless network 106 such as a wide area network. The wireless network could alternatively be a MAN, LAN or other network to facilitate the transmission of data between remote devices.

The software associated with the merchant terminal 102 comprises a merchant interface application 110. The merchant interface application may be installed on the merchant terminal. Alternately, the merchant interface may run on a remote source and accessed by the merchant terminal via the wireless network 106. For example, the merchant interface application may be accessed via an internet browser.

The software associated with the wireless handset 108 comprises a user profile interface 120 and a content interface 122. The user profile interface and the content interface may be components of a single application or may be separate applications. The content interface and user profile interface may run on the handset or may run on a remote source and be accessed by the wireless handset via the wireless network 106. The user of the wireless handset uses the user profile interface to provide information to the user profile component 114 of the system database 112. In some embodiments, the user may use a personal computer or other computing device to provide user information to the user profile component. The content interface 122 receives content from the server 104 and presents the content to the wireless handset user. Content interface 122 may be referred to as a Mobile Autonomous Dynamic Graphical User Interface (MADGUI). The MADGUI is described in more detail below. Additional applications, such as Loyalty Program applications and Food and Beverage Ordering applications, may be delivered from the server 104 to the wireless handset 108 individually or via the MADGUI.

A system database 112 runs on the server 104. System database 112 comprises a user profile component 114 and a merchant content component 116. The user profile component 114 comprises user attributes provided by the user through the user profile interface 120. In some embodiments, the user profile component further comprises user attributes generated by the merchant. For example, the merchant may generate a user attribute indicating the transaction history for a user. The merchant content component 116 comprises information provided by the content administrator through the merchant interface 110.

A content delivery application 118 also runs on the server 104. The content delivery application filters content stored in the system database 112 and delivers the filtered content to content interface 122 on wireless handset 108. The filtering applied to the content is described in more detail below.

The merchant interface 110 may comprise one or more interface modules, such as a content generation module 124 and a content association module 126. The content generation module 124 allows a content administrator to upload content items to the merchant content component 116 of the system database 112. The content administrator is a person who uses the merchant interface 110 to provide content to the server 104. The content association module 126 allows the content administrator to create content associations in the merchant content component 116 of system database 112. The content associations may include associations of content with user attributes stored in the user profile component 114 of system database 112. The associations between the merchant content and user attributes are stored in merchant content component 116. The merchant content stored at merchant content component 116 is filtered by content delivery application 118 and delivered to content interface 122 via wireless network 106.

Figure 2:
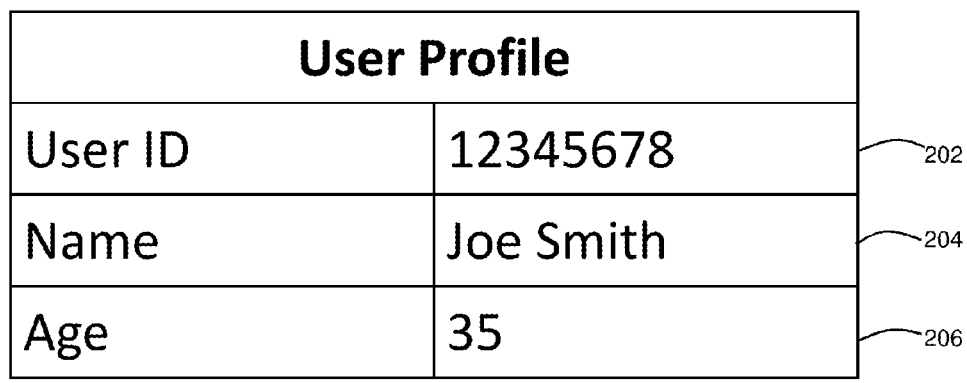
FIG. 2 shows an illustrative database table entry for a user profile.

Referring to FIG. 2, an illustrative database table entry 200 for a user profile is shown. The User Profile Table resides in user profile component 114 of system database 112 on server 104. The table may be populated with information provided via a user interface on the wireless handset 108. In some embodiments, the user enters user profile information using an interface on a home computer or using a terminal located in the merchant space. The User Profile Table may store information such as a user ID 202, name 204, and age 206. The table may also store additional information, such as a user address, phone number, and other contact and demographic information.

Referring to FIG. 3A, an illustrative database table entry 300 for the User Attribute Table is shown. The user attribute table may be located on wireless handset 108 or on user profile component 114 of system database 112 on server 104. Locating the user attributes table on the wireless handset protects user privacy by maintaining information in a location where the user has control over the information. The user attribute table stores a user ID 302, an unique attribute identifier 304, an attribute category 306, and an attribute value 308. Attributes may be linked to a single user in a many-to-one relationship through use of a user attribute table. A user attribute may indicate demographic information such as the user's age or gender, the hobbies or interests of the user, or other information relevant to the user's potential interest in a particular product or service. In some embodiments, demographic information from a user profile table is propagated to the user attribute table. For example, when the user creates a user profile indicating the user's age, an entry in the user attribute table may be automatically generated to associate the user's User ID with the Attribute ID corresponding to the user's age.

In the User Attribute Table, attribute category "Game" may have several attribute values associated with it, such as "Blackjack," "Poker," "Slots," and "Keno." Entry 300 links the user ID 202 of FIG. 2 with the attribute value "Blackjack". The data stored in entry 300 indicates that User 12345678 has an interest in the game blackjack. This is information that may have been provided by the user through an interface on a wireless handset 108 or other device.

Referring now to FIG. 3B, an illustrative database table entry 320 for the Attribute Group Table is shown. Each entry in the Attribute Group Table associates a user ID 322 with an attribute ID 324. The Attribute Group Table may be populated with values stored in the User Attribute Table on a periodic basis, such as an hourly, daily, or weekly basis. In some embodiments, the Attribute Group Table is updated every time the User Attribute Table is changed. The use of an Attribute Group Table increases the efficiency of delivering content to users.

Figure 4:
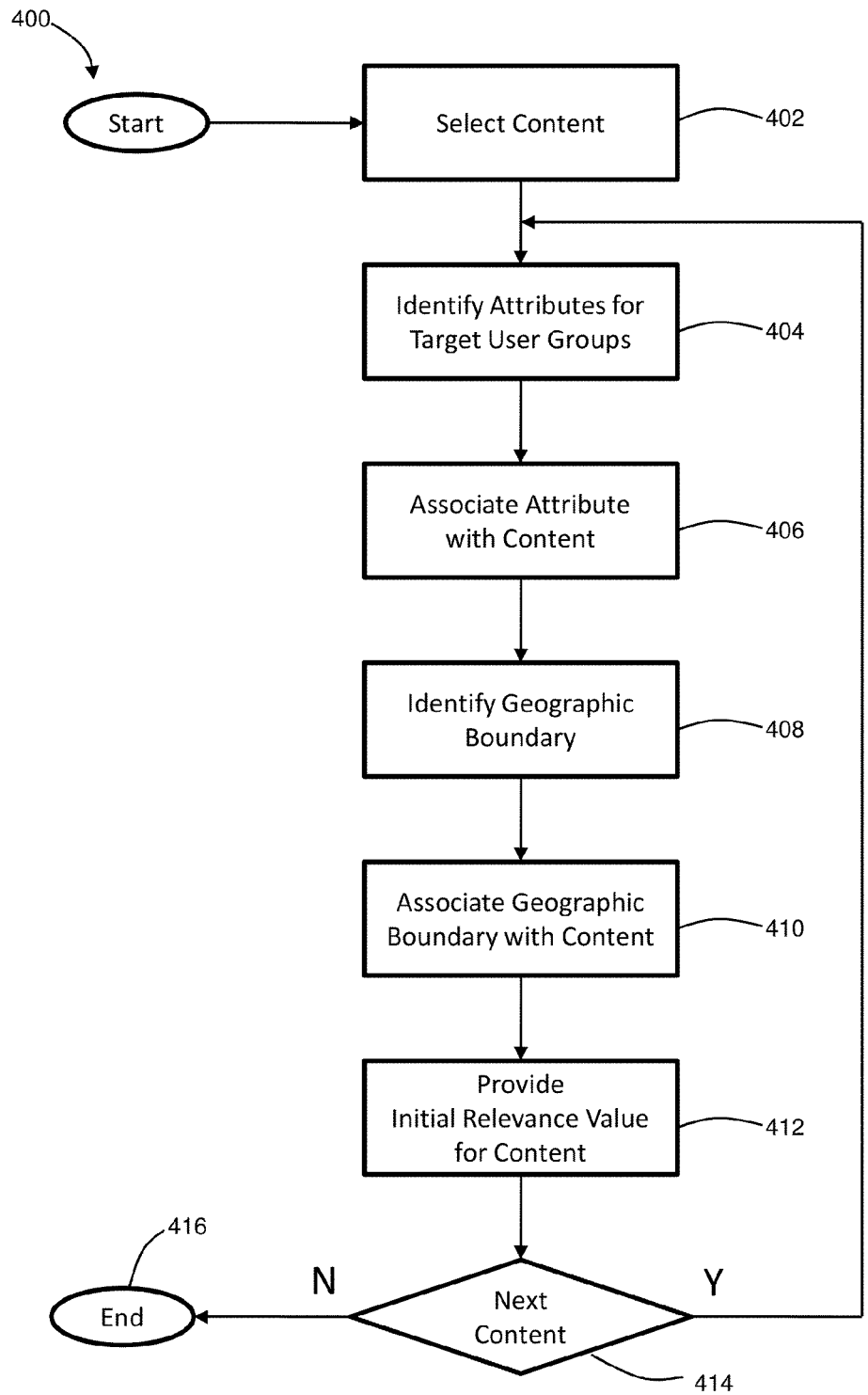
FIG. 4 shows an illustrative flow chart for associating content with one or more geographic boundaries and optionally one or more user attributes.

Referring to FIG. 4, an illustrative flow chart for associating content with one or more geographic boundaries and optionally one or more user attributes is shown. The method begins at block 402, in which the content administrator chooses a content item. A content item may be any information or product promotion which the merchant wishes to share with a user. For example, content may include a product location, product details, event information, or a coupon. A content item may also be a link to one or more content items, such as a restaurant menu that links to a list of menu items. In some embodiments, a content item may be an application, such as a purchasing or gaming interface.

The method proceeds to block 404, in which the content administrator optionally identifies group attributes to associate with a content item. For example, if a content item "Casino Floor" was selected at block 402, the content administrator may wish to associate user attributes indicating an interest in gaming activities with the content item. The content item "Casino Floor" may be a link leading to a list of casino floor activities, such as a "21 Tournament". The content administrator may wish to associate user attributes indicating an interest in the game blackjack with the content item "21 Tournament." At block 406, the content administrator associates the selected user attributes with the selected content item.

In some embodiments, the merchant is prevented from accessing some or all of the information stored in the user profile. User privacy may be protected by restricting merchant access to sensitive user information. For example, the merchant may be able to determine how many users fall within a particular age range without being able to access the user attribute indicating user age for a particular user.

At block 408, the content administrator uses a content bubble interface to define a geofence on or near a merchant property. The geofence is a virtual boundary line enclosing part or all of a merchant space. The area within the geofence may be described as a content bubble because the content administrator may associate the geofenced area with one or more content items. Content bubbles are described further below with reference to FIG. 6. At block 410, the content administrator may associate a content bubble defined by the geofenced area with the selected content.

At block 412, the content administrator provides an initial relevance value for the content item. The initial relevance value indicates the applicability of the selected content item for the selected group attribute as perceived by the content administrator. For example, for the content item 21 Tournament, the content administrator may assign a higher initial relevance value for the user attribute value blackjack than the content administrator would assign for the user attribute value poker, since a user who has indicated an interest in blackjack may be more likely to be interested in a 21 Tournament than a user who has indicated an interest in poker.

At decision diamond 414, the content administrator may proceed to the next content item if the content administrator wishes to associate a next content item with a next user attribute value. If the content administrator has made all assignments, the method ends.

In some embodiments, the content administrator may also exclusively associate a group attribute with a content item. For example, if the content administrator intends for the content item Room Service to be hidden from users who are not staying in a room on the premises, the content administrator may exclude such users from receiving the content item. The group attribute corresponding to users not staying on the premises is excluded from association with the content item Room Service.

Figure 5A:
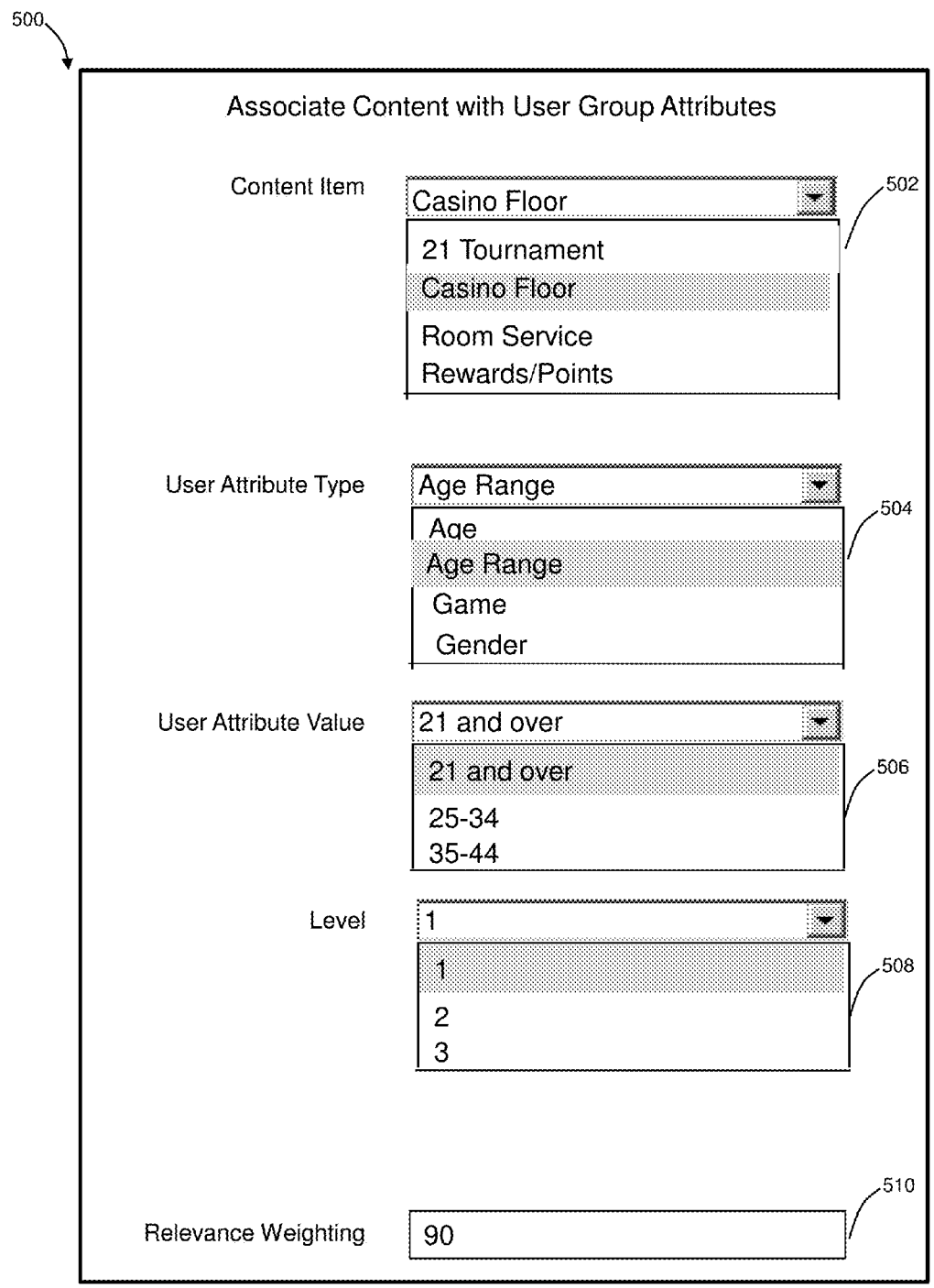
FIGS. 5A-5B show an illustrative content administrator interface for creating content connections.

Referring to FIG. 5A, an illustrative content administrator interface 500 for creating content connections is shown. The content administrator may use the interface shown in FIGS. 5A-5B to carry out optional association of content items with user attributes as indicated in FIG. 4. The content administrator selects a content item from a predefined list of content items as shown in the drop down menu 502. The list of content items is comprised of content previously uploaded by the content administrator and stored in the database. In the illustrative example shown in FIG. 5A, the content administrator has chosen the content item "Casino Floor."

The content administrator chooses a group attribute to associate with the content item using drop down menus 504 and 506. At menu 504, the content administrator chooses attribute type "Age Range." In menu 506, the content administrator has selected the attribute value "21 and over" to associate with the selected content item. Only those users who are above the age of 21, as indicated in the user profile stored in the user profile component 114 of system database 112, will receive the content specified in menu 502.

In some embodiments, the merchant may associate content items with merchant generated attributes. Merchant generated attributes are attributes associated with a user that were not specified by the user. For example, a merchant generated attribute may include past user gaming history, such as a history of using slot machines.

The content administrator is provided with a level menu 508. The level indicates whether the content item is a parent item, such as a standalone link or a link to a submenu, or a child item, such as a submenu content item. As shown at 508, the content administrator has specified that content item Casino Floor is a level 1 item. This indicates that the Casino Floor content item is a top level content item which may serve as a parent to a set of lower level content links.

The content administrator may assign an initial relevance value to the content-attribute association created in tables 502-506. The initial relevance value may be a numerical value, such as a number falling in the range of 1-100, with 1 indicating minimum relevance and 100 indicating maximum relevance. As shown in 510, the content administrator has chosen an initial relevance weighting value of 90.

Figure 5B:
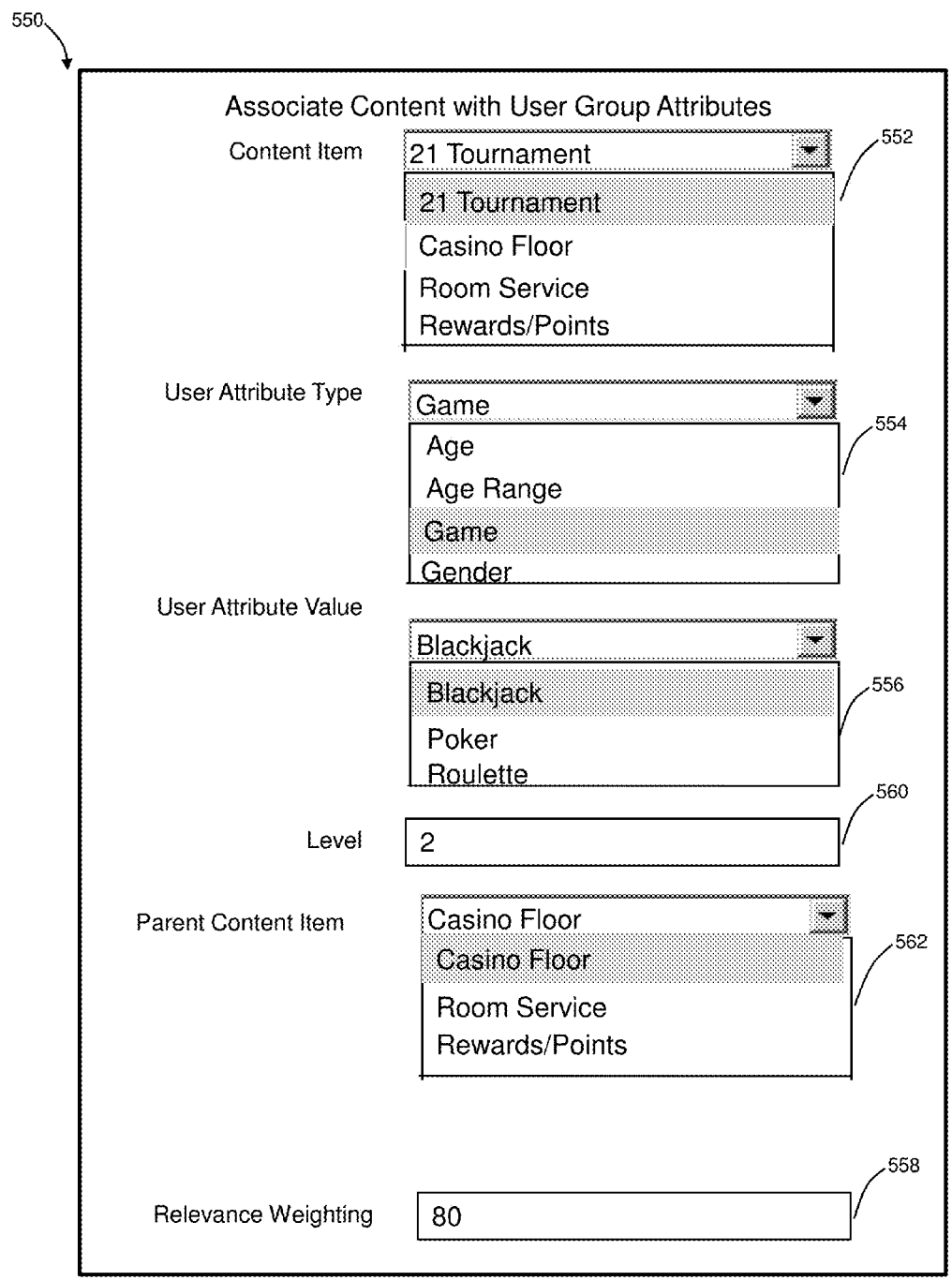

Referring to FIG. 5B, a second illustrative content administrator interface 550 for creating content connections is shown. The content administrator may desire to associate content items comprising a submenu to a top level content item. For example, the content administrator may wish to create a submenu for content item Casino Floor. The submenu may contain, for example, content item "21 Tournament." To create the submenu, the content administrator selects the desired submenu content item from Content Item menu 552. The content item 21 Tournament has been selected from Content Item menu 552. The content administrator then creates content connections to associate one or more user attributes with the content item. For example, in drop down menu 554, the content administrator has chosen the user attribute type Game. The content administrator may wish to associate the content item(s) with an attribute type without specifying an attribute value. For example, the content administrator may choose to associate the selected content item 21 Tournament with all users who have selected user attribute type Game.

Alternatively, the content administrator may wish to associate the selected content items with a group attribute having a particular value. In menu 556, the content administrator has selected the attribute value "Blackjack" to associate with the selected content items. Only those users who have indicated an interest in Blackjack through the user attributes associated with their user profiles will receive the content specified in menu 552.

To indicate that the content item selected, 21 Tournament, is linked to a parent content item, the content administrator sets the level to a value that one greater than the value of the parent level. Thus, since 21 Tournament is an item in a submenu of menu item Casino Floor, 21 Tournament is give a level value of 2, which is one greater than the Casino Floor level value of 1. If the level value is greater than one, a Parent Content Item menu appears as shown at 562. The parent content item menu is populated with all content items having a level value that is one fewer than the level value specified in 560. Thus, since Casino Floor was given a level value of 1, which is one fewer than the level value specified in 560, the content item Casino Floor appears in the Parent Content Item menu. The content administrator chooses the parent content item, for example, Casino Floor, to assign the level 2 content item 21 Tournament to level 1 content item Casino Floor.

If the content administrator wishes to create additional level 2 submenu items under level 1 menu item Casino Floor, the content administrator adds new content item associations, specifying a level value of 2 and a parent item of Casino Floor. The content administrator may also create submenus of submenus by creating a level 3 content item and specifying a level 2 parent content item for the level 3 content item.

As for the parent content items, the content administrator may assign an initial relevance value to the child content item. As shown in 558, the content administrator has chosen an initial relevance weighting value of 80.

In FIG. 5B, the content administrator has selected "21 Tournament" from the submenu items list. A user in the age group 21 and over may receive the content item Casino Floor on the user's wireless handset, as established in the interface shown in FIG. 5A. If the user selects Casino Floor, the user will be shown a submenu comprising the content item "21 Tournament," as established in the interface shown in FIG. 5B.

In some embodiments, the content administrator is able to associate additional filters with the content item user attribute association. The content administrator may wish to serve content to a user based on a time range, date, or user location. For example, the content administrator may associate a content item such as a coupon for coffee with a time range, such as 7:00 AM to 11:00 AM, so that the coupon is delivered to users during this time range. In a second example, the content administrator associates a coupon for coffee with a time range and with a user attribute indicating a user preference for coffee. In the second example, only those users that have specified a preference for coffee receive the coffee coupon content item during the specified time range. Content may be filtered by user location based on information provided by the user's wireless handset to the server regarding the user's location. In some embodiments, the content administrator may associate a content item with a time, date, location, or other filter without associating the content item with a user attribute. In other embodiments, the content administrator may be able to provide content items to all users by indicating no filter is to be applied to such content items.

Figure 6:
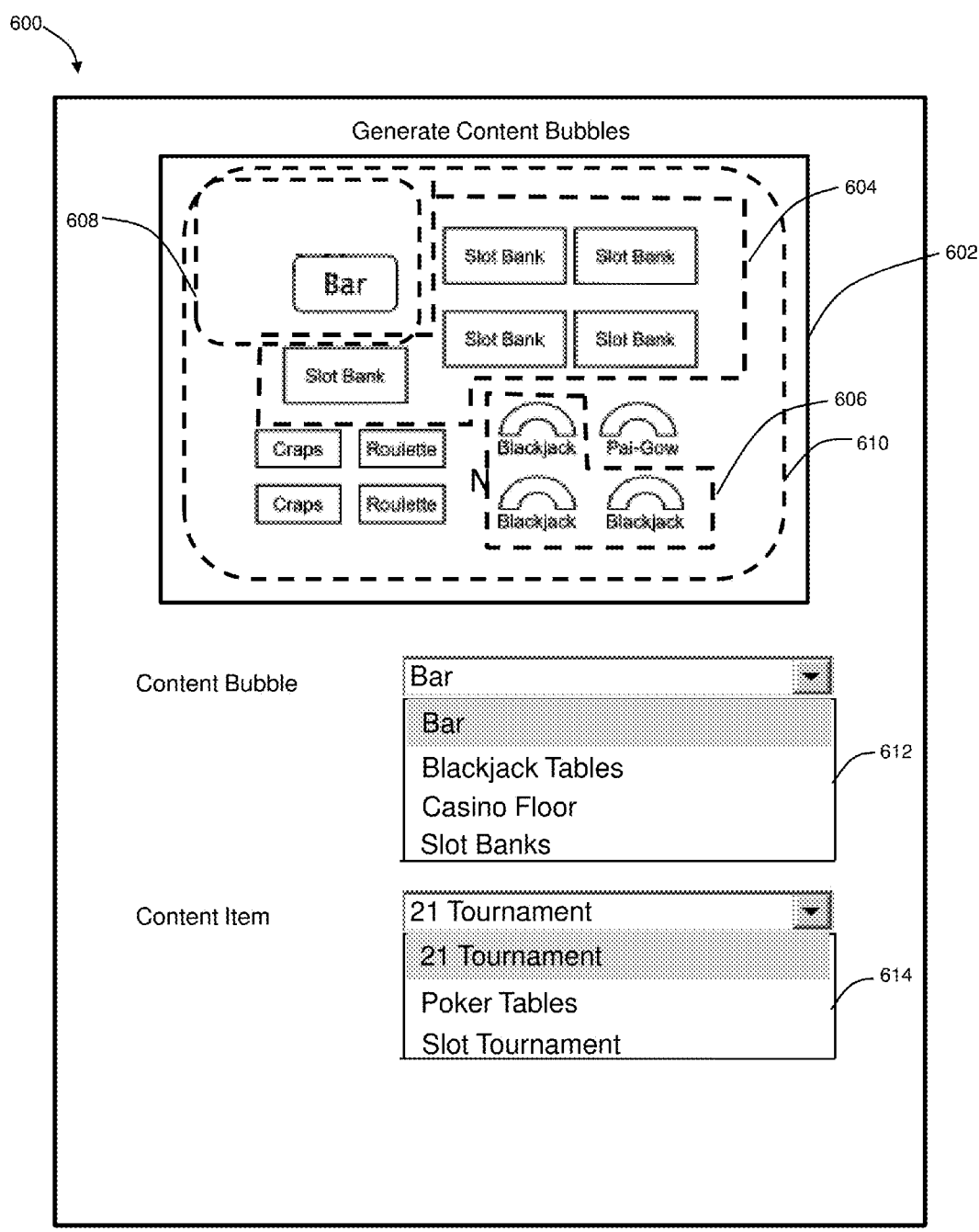
FIG. 6 shows an illustrative content bubble generation interface.

Referring to FIG. 6, an illustrative content bubble generation interface 600 is shown. The content administrator uses the content bubble generation interface to define one or more sections of the area on or near a merchant premises with which the content administrator wishes to associate content items. The content administrator provides a map 602, such as a premises floor plan, on which the content bubbles will be defined. The map may be provided by uploading an image file to the content administrator interface. Multiple content bubbles may be defined for a single merchant area. The content bubbles may overlap.

In FIG. 6, content bubbles 604, 606, 608 and 610 have been defined, corresponding to the Slot Banks area, the Blackjack Tables area, the Bar area, and the entire Casino Floor, respectively. The interface comprises a Content Bubble selection drop down menu 612 and a Content Item selection drop down menu 614. Content bubble 608 corresponding to the bar area has been selected from Content Bubble menu 612. The content administrator has chosen from Content Item menu 614 the content item 21 Tournament. The information entered in the interface shown in FIG. 5 is used to determine which users will receive the content items designated in menu 614. In FIG. 5B, the content item 21 Tournament was associated with a user having a user attribute indicating a preference for blackjack. Because this content item has been associated with content bubble 608 (the Bar area), when a user having the blackjack preference moves into the Bar content bubble, the user will receive the 21 Tournament content item.

In some embodiments, relevance weighting and parent-child relationships may be established using the content bubble generation interface as described with reference to FIGS. 5A-5B.

Figure 7:
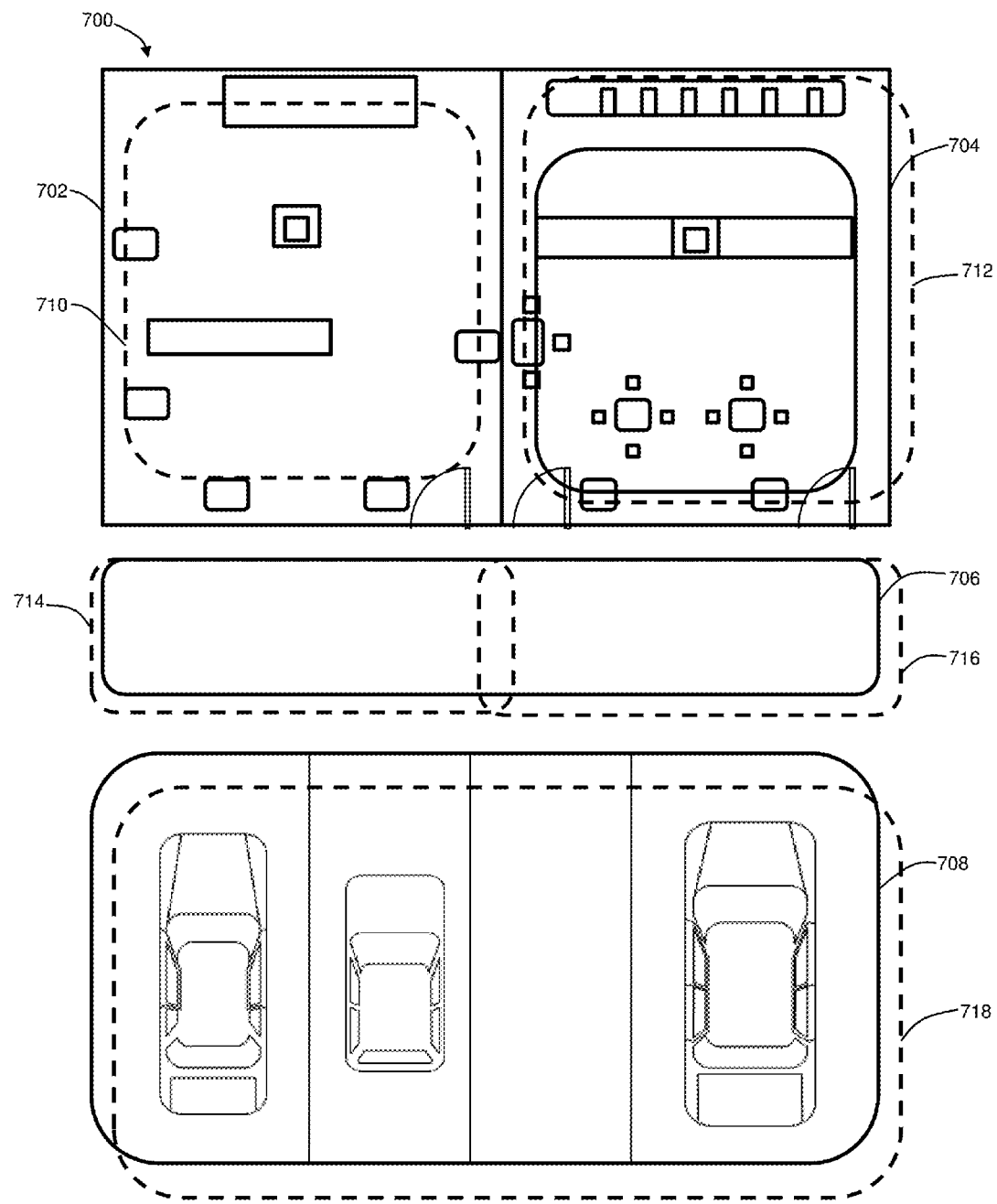
FIG. 7 shows an illustrative content bubble layout relative to a merchant premises map.

Referring to FIG. 7, an illustrative content bubble layout 700 showing content bubble designations for exterior and interior spaces is shown. In some embodiments, the merchant may wish to provide contents to users who have not yet entered a merchant premises. In FIG. 7, a content administrator has defined content bubbles surrounding parking lot and sidewalk areas proximate to the merchant premises. The map in FIG. 7 indicates a retail space 702, a food and beverage space 704, a sidewalk 706 that is proximate to the retail and food and beverage space entries, and a parking lot 708 proximate to the sidewalk. Content bubbles have been defined for the retail space and the food and beverage space as shown at 710 and 712, respectively. Content bubble 714 has been defined for the sidewalk space in front of retail space 702 and content bubble 716 has been defined for the sidewalk space in front of food and beverage space 704. A content bubble 718 has been defined for the parking lot area 708.

Figure 8:
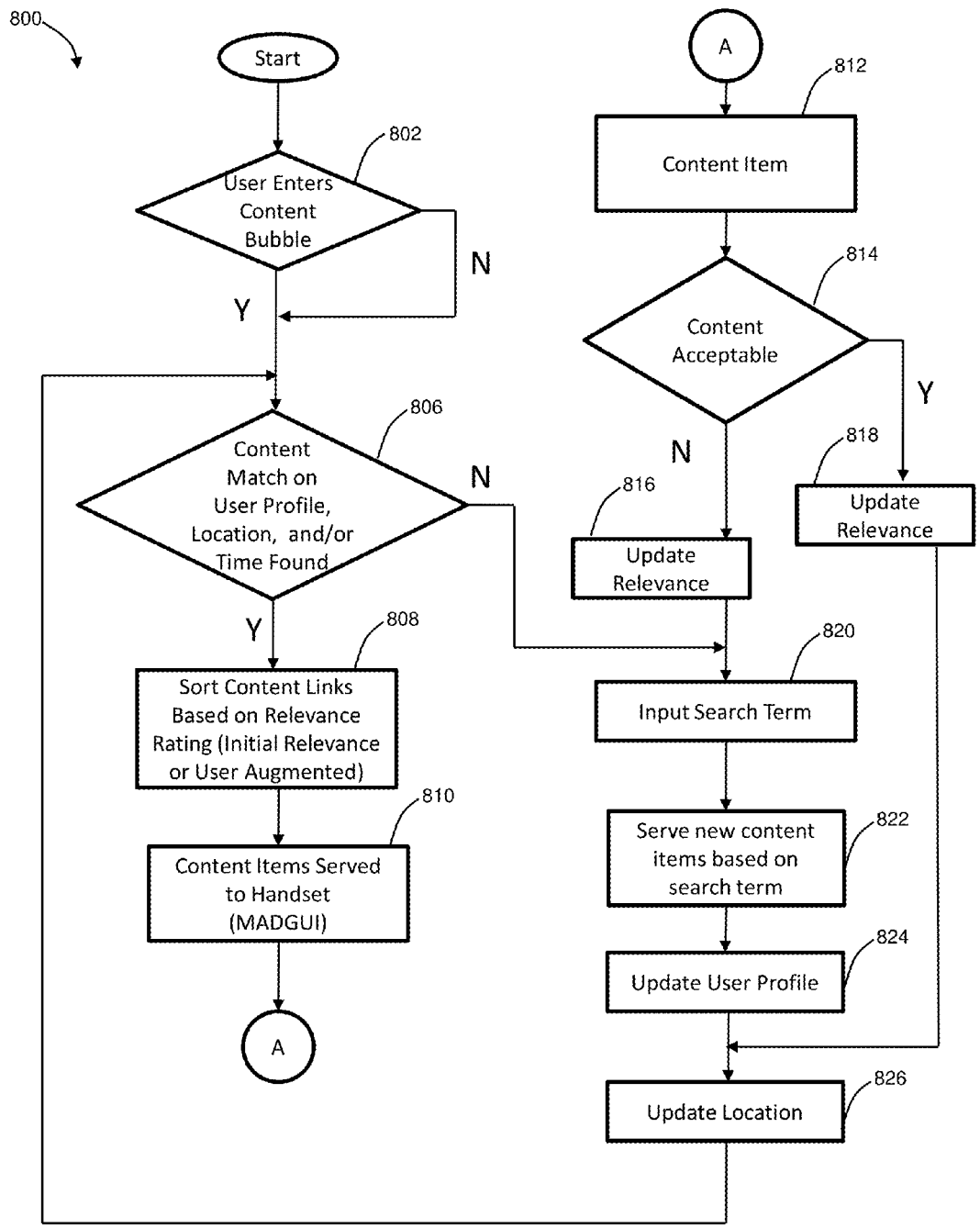
FIG. 8 shows an illustrative flow chart for delivering content to a user.

Referring now to FIG. 8, a flow chart 800 illustrating a method for delivering content to a user is shown. The method begins at decision diamond 802, in which the handset application running on wireless handset 108 continually sends the user location to server 104 and the server determines whether the user location corresponds to the area within a content bubble.

User location relative to a content bubble may be determined by global positioning system (GPS) coordinates, signal strength from merchant-installed wireless access points, or signal strength from known regional wireless access points as detected by wireless handset 108. When the wireless handset uses signal strength detection, user location may be estimated from the strongest signal strength measured, or may be trilaterated from multiple detected signal strengths. Trilateration involves finding the point of intersection of three sphere surfaces.

If the user has entered a content bubble, the handset sends the user ID and location to the server. The content delivery application running on server 104 may use one or more of the location, the local time at the user location, and the user group attributes associated with the user ID to determine which content to deliver to the handset, as shown at decision diamond 806. If no content matches are found, the user may be prompted to input a search term as indicated at block 820, allowing the user to find relevant results.

There may be a maximum number of content items desired to be displayed on the handset. The maximum number may be determined by the content administrator or by the handset user. If the number of content matches found exceeds the number of content items to be displayed, the content delivery application may sort through the content matches to find the most relevant matches, as shown at block 808. In some embodiments, content matches will only be displayed when a relevance value exceeds a threshold value, for example 0.5 on a scale of zero to 1. The relevance value may be based on an initial relevance value set by a content administrator. The relevance value may be updated in accordance with user feedback.

At block 810, the selected content matches are sent from server 104 to the MADGUI running on wireless handset 108. The method continues to block 812, in which a user selects a content item. The user may be presented with an option to provide feedback on the content item, as indicated at decision diamond 814. User feedback may be provided via a ranking system. For example, the user may be provided with the option to rate the content item on a scale of one to five stars. The user may also be provided with the option to reject or accept the content item. In some embodiments, data on the acceptability of the content provided to the user is collected without active input of the user, for example, by tracking clickthrough rates on the content items served. The content acceptability feedback is used to update the relevance value for the content item, as indicated at blocks 816 and 818.

If the content is deemed acceptable, the method proceeds to update the location of the handset as indicated at block 826.

If the content is deemed unacceptable or receives a low user rating, the user may be prompted to input a search term as indicated at block 820, allowing the user to find preferable results. The method then proceeds to block 822, in which new content items are served based on the results of the search performed using the entered search term. A user attribute may be added to the user profile based on the search term input by the user, as indicated at block 824. The method then proceeds to block 826, at which point the handset sends an updated user location to the server. The server performs a new content search based on the updated location, as indicated at decision diamond 806.

Referring to FIG. 9A-9D, an illustrative content interface (MADGUI) is shown on a wireless handset. The handset shown is a slide phone having a retractable keypad, however, the wireless handset may be a bar-type or flip-type phone or a phone having a touchscreen interface. The MADGUI is initiated by the handset application when content matches are found as indicated in decision diamond 806. When content matches are found, the MADGUI is populated with content matches sent from server 104. The server delivers content to the user based on the content item-user attribute associations and other filters the content administrator has specified. Wireless handset display 900 shows Coffee Shop 902, Shoe Store 904, Spa and Fitness 906, Retailers 908, Restaurants 910, and a 10% Coupon for Coffee 912.

The user may have received Coupon 912 based on a preference expressed in a user attribute. Alternatively, the Coupon may have been received based on the time of day that the user is accessing the MADGUI. For example, the content administrator may have specified that a coffee coupon is to be provided between the hours of 9 AM and 1 PM. Finally, the Coupon may have been received based on a combination of a user profile preference and another filter such as a time filter. Similarly, the other MADGUI items may be based on a user attribute-content item association provided by a content administrator, a filtering association, or a combination of user attribute and filter association with a content item.

If the user selects Restaurants 910, the user may be provided with a submenu of restaurants in the vicinity of the user. The list of Restaurants may be filtered based on user attributes or based on the past behavior of the user. If the user selects Spa and Fitness 906, the user may receive a submenu of services available from the Spa. The submenu of services may be filtered to include only those services the user has engaged previously. The submenu may include a coupon for a particular service or a service engaged previously.

Figures 9A, 9B:
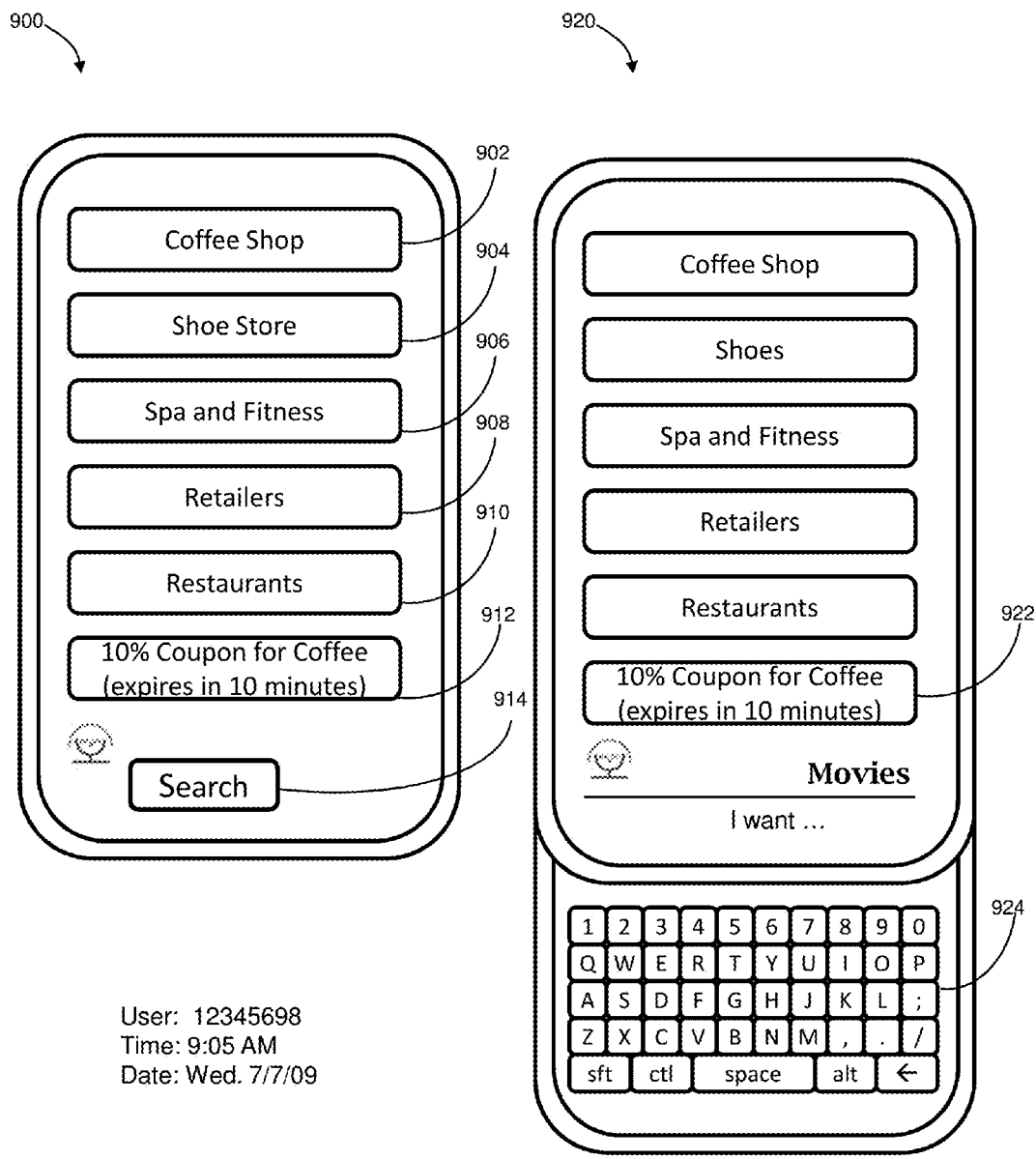

Referring to FIG. 9B, an illustrative MADGUI prompting a user to input a search item is shown. The user may be prompted to or choose to input a search item, for example, by being shown or hitting a search button such as the button shown at 914 in FIG. 9A, if none of the content items delivered in the MADGUI are acceptable. In FIG. 9B, the user has entered the search term "Movies" at 922. The user may use keypad 924 to enter the search term. Other wireless handsets may allow search term entry using the handset's numeric keypad, touchscreen keypad, or other input device. The MADGUI application will perform a search of merchant content items applicable to the search term and present content to the user based on the results of the search.

In FIG. 9C, an illustrative MADGUI presented to a user later in the day is shown. The content administrator has specified that content items such as Casino Floor 942 and Casino Activities 944 should be shown to the user, for example, between noon and midnight.

In FIG. 9D, an illustrative MADGUI with submenu deployed is shown. As a result of the user selecting item 942, "Casino Floor," a submenu 962 has been deployed. Because the user 12345678 has an age exceeding 21, content item Casino Floor may be delivered to the user's wireless handset due to the content connection established as shown in FIG. 5A. If the user has indicated an interest in blackjack, the user may also receive the content item 21 Tournament due to the content connection established as shown in FIG. 5B. The user may also receive the content item 21 Tournament if the user's wireless handset detects that the user is in the content bubble corresponding to the Bar due to the content connection established as shown in FIG. 5A. Whether the user will receive the content item may depend on factors such as the relevance weighting for the content item relative to other content items which match the user's attributes. As FIG. 9D indicates, the user has received the content item Casino Floor. The level 1 content item Casino Floor was established as the parent of level 2 content item "21 Tournament" as shown in FIG. 2. 21 Tournament appears as a content item in submenu 962 after the parent content item Casino Floor is selected.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A content delivery system comprising:
    a database that includes at least one user profile, in which each user profile comprises a plurality of user attributes;
    the database including a plurality of content items, in which each content item is associated with at least user attribute;
    the database including at least one indoor geofence associated with each content item;
    a content presentation module presenting a first list of targeted content items associated with a first user profile on a first wireless device, wherein the first list of targeted content items corresponds to a first user attribute and a particular indoor geofence;
    the content presentation module presenting a second list of targeted content items associated with a second user profile on a second wireless device, wherein the second list of targeted content items corresponds to a second user attribute and the particular indoor geofence; and
    wherein the first list of targeted content items presented on the first wireless device is different from the second list of targeted content items presented on the second wireless device at the particular indoor geofence, when the first user attribute is different from the second user attribute.

2. The content delivery system of claim 1, wherein the database includes a relevance value for each content item that ranks the content items based on user feedback to the first list of targeted content items.

3. The content delivery system of claim 2, wherein the relevance value for a content item that receives positive feedback improves the ranking of the content item in the first list of targeted content items.

4. The content delivery system of claim 1, wherein the database includes a time range that is associated with a content item, which presents the content item within the corresponding time range.

5. The content delivery system of claim 1 further comprising a parent content item displayed on at least one list of targeted content items, in which the parent content item is associated with a child content item so that a selection of the parent content item presents the associated child content item.

6. The content delivery system of claim 1, wherein the first list of targeted content items includes a plurality of food and beverage ordering content items.

7. The content delivery system of claim 1, wherein the first list of targeted content items includes a plurality of loyalty program content items.

8. The content delivery system of claim 1 further comprising a search term received on a wireless device that finds relevant content items corresponding to the search term, which are presented on the wireless device.

9. A computer implemented method comprising:
    identifying at least one user profile in a database, in which each user profile comprises a plurality of user attributes;
    identifying a plurality of content items in the database, in which each content item is associated with at least one user attribute;
    identifying at least one indoor geofence associated with each content item in the database;
    generating a first list of targeted content items associated with a first user profile associated with a content presentation module, wherein at least one of the first list of targeted content items is associated with a first user attribute and a particular indoor geofence;
    generating a second list of targeted content items associated with a second user profile associated with the content presentation module, wherein at least one of the second list of targeted content items is associated with a second user attribute and the particular indoor geofence; and
    presenting the first list of targeted content items on a wireless device that is different from the second list of targeted content items presented on a second wireless device at the particular indoor geofence, when the first user attribute is different from the second user attribute.

10. The computer implemented method of claim 9, wherein the database includes a relevance value for each content item that ranks the content items based on user feedback to the list of targeted content items.

11. The computer implemented method of claim 10, wherein the relevance value for a content item that receives positive feedback improves the ranking of the content item in the first list of targeted content items.

12. The computer implemented method of claim 9, wherein the database includes a time range that is associated with a content item, which presents the content item within the corresponding time range.

13. The computer implemented method of claim 9 further comprising a parent content item displayed on at least one list of targeted content items, in which the parent content item is associated with a child content item so that a selection of the parent content item presents the associated child content item.

14. The computer implemented method of claim 9, wherein the first list of targeted content items includes a plurality of food and beverage ordering content items.

15. The computer implemented method of claim 9, wherein the first list of targeted content items includes a plurality of loyalty program content items.

16. The computer implemented method of claim 9 further comprising receiving a search term on the wireless device that finds relevant content items corresponding to the search term, which are presented on the wireless device.

\* \* \* \* \*